Oct. 15, 1935.  N. GALLIOT  2,017,043
DEVICE FOR CONVEYING GASEOUS STREAMS
Filed Sept. 12, 1931  2 Sheets—Sheet 1

Inventor,
Norbert Galliot,
By Sommers & Young
Attys.

Patented Oct. 15, 1935

2,017,043

UNITED STATES PATENT OFFICE 2,017,043

DEVICE FOR CONVEYING GASEOUS STREAMS

Norbert Galliot, Vaucresson, France

Application September 12, 1931, Serial No. 562,555
In France September 17, 1930

3 Claims. (Cl. 138—40)

My invention relates to a method of guiding fluids through pipes. An essential feature of the method according to my invention consists in imparting to said fluids, in said pipes, a rapid rotary motion about the axis of said pipes, in order to apply the fluid stream against the inner walls of the pipes through which it flows. An object of my invention is to apply the fluid against the wall of the pipe, whatever the shape of the latter may be.

A further object of my invention is to force the fluid to strictly follow the inner walls of the pipes, whatever the shape of the latter may be, this preventing the formation of whirlpools or eddies in the flow of the fluids, even should the dimensions of the pipes not correspond exactly to the dimensions calculated and formed in accordance with the pressure of the fluids which expand therein.

A third object of my invention is to allow the fluids to pass through annular apertures, bordered by the edges of the fluid inlet pipe, without any wiredrawing, slowing down or eddying taking place in the flow of said fluids.

A fourth object of my invention is to allow for the rapid outflow of the fluids by providing the inner surface of the pipes with slits or apertures through which the fluid applied, through centrifugal force, against said surfaces, may escape.

My invention also comprises various devices contrived to impart to the fluids which circulate in the nozzle or pipes a rapid rotary motion, as above stated, about the axis of said nozzles or pipes.

Preferred embodiments of my invention will be hereinafter described with reference to the accompanying drawings given merely by way of example and in which.

It is well known that the nozzles employed in steam engine turbines have to be calculated and formed in accordance with the pressure of the fluids which are to expand in said nozzles.

The rules for the construction of said nozzles are very strict as, should such rules be overlooked, turbulence such as the parting of the water stream, whirlpools, eddies, etc., are due to occur.

On the other hand, studies concerning the nozzles employed on fire-arm muzzle brakes have shown that the above mentioned rules need not be strictly observed in such nozzles.

This remarkable result is due to the fact that the gaseous stream which circulates through said nozzles (when the muzzle brakes are adapted to grooved fire-arms) rotates about the axis of the nozzle due to the presence of the grooves in the barrel of the fire-arm.

Being given that the rotary motion removes the necessity of observing the rules above referred to, I have conceived the imparting of such a rotary motion to fluids flowing through any nozzles whatever in order to obtain an improved efficiency, particularly in the case of explosion turbines. Furthermore, I may utilize the centrifugal force thus applied to the fluids for various other purposes which will be hereinafter explained.

In order to produce the rotary motion of the fluid stream, or in order to accelerate that rotation, I may either provide helical grooves in the nozzle itself, or include in said nozzle a grooved element, or, again, introduce a grooved element somewhere in its length.

Figure 1:
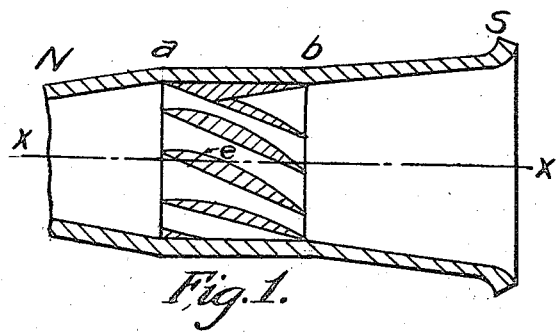
Fig. 1 is a sectional view of a nozzle provided with a device adapted to impart to the gases a rapid rotary motion about the axis of said nozzle.

Fig. 1 shows, by way of example, a nozzle made according to the third of these embodiments.

Nozzle NS (Fig. 1) is provided, at $ab$, with more or less salient ribs. The object of said ribs is to cause the fluid stream to rotate, or to accelerate its rotary motion in a determined direction, taking into consideration, if necessary, the direction in which the gas jet will run along the blades of the turbine.

The gas jet thus set in rotation along its path offers more resistance to turbulent influences liable to create whirlpools or eddies.

It should be noted that the surfaces of the ribs, when developed and shown in sectional view, should preferably have the shape of a section of an aircraft propeller blade (see $e$, Fig. 1), in order to avoid the formation of eddies when the gases enter into and issue from the grooved part of the nozzle.

A particularly interesting application of my invention consists in applying said rotary motion to fluids which flow through the nozzles or pipes for the circulation of a combustible mixture in explosion or internal combustion engines. By this device, not only may the pipes be of substantially any shape and have any section without eddies or whirlpools occurring, but, moreover, when passing by the valves, the gaseous stream will have a natural tendency to pass as near as possible to the seat of the valve, i. e., between said seat and the edge of the valve plate, so that, when the stream passes through the valve, neither throttling nor shock will occur. This will prevent whirlpools or eddies, which tend, as is well known, to interfere with the outflow of the combustible mixture and, as a consequence, to reduce the filling of the cylinders and the power of the engine.

The following advantages may also be derived from my invention: the density of the mixture will be greater on the periphery of the pipe and smaller in its center, this stirring up the combustible mixture in the neighbourhood of the walls and preventing small drops of gasoline, or of similar combustible liquids, to settle on said walls. If the pipe through which the combustible mixture flows is heated by the engine, the combustible mixture applied against the wall of the pipe will also be heated intensely, this resulting in a better gasification of the combustible liquid.

Figure 2:
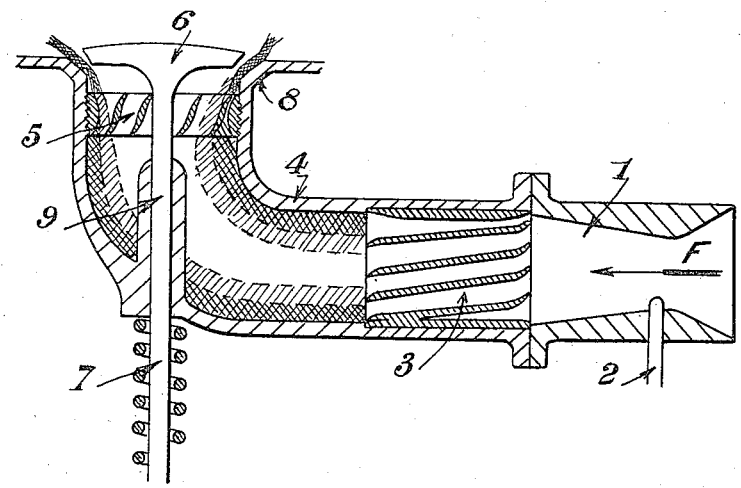
Fig. 2 is a sectional view showing the application of the invention to pipes and tubes through which a combustible mixture circulates in explosion or internal combustion engines.

Naturally, in each part of the pipe, the most appropriate rotary motion will be imparted by providing grooves in the wall, or in certain parts of the wall, as shown, for instance in Fig. 2.

In Fig. 2, which shows such an embodiment of my invention, 1 is the caburetor choke tube, 2 is the jet. The air flows in the direction shown by arrow F. Upon issuing from the choke tube, the air, loaded with fine gasoline drops and vapour, is given a rotary motion around the axis of the gaseous column by means of ribs 3, above mentioned. Upon issuing from said grooved part, the gaseous current is thrown against the walls of pipe 4, the variations in density being shown by the cross hatching. Said current is then caught up by grooves, or ribs, 5, of a smaller pitch, this imparting to said current an accelerated rotary motion by increasing its density in the neighbourhood of the walls and diminishing it in the vicinity of the axis of the current. The result is that the gaseous current has a natural tendency to pass, almost entirely, between the edge of head 6 of valve 7 and seat 8 of said valve. It will keep clear of the valve head and of rod 9 and will not be submitted to any appreciable whirlpool or stoppage from these organs.

Naturally, the disposition in the above embodiment of my invention is not necessary and it may be modified to suit any particular circumstances.

My invention is not only applicable to the flow of gases between the carburetor and the engine, but it may also be applied to the evacuation of gases at the engine outlet. When gases issue from an engine, or from any apparatus which lets out gases (generally into the atmosphere), they possess a kinetic energy which may be directly detrimental to people or objects situated in the vicinity, for instance in the form of a shock, or indirectly detrimental, in the form of noises.

Mufflers have been contrived to regulate the flow of said gases by slowing it down. The inconveniences of such devices are that they necessitate voluminous and heavy mechanical organs and that, which is more serious, they are detrimental to the efficiency of the apparatus (engine, fire arm mouth brake, motor car brake), as they interfere with the flow of the gases which, on the contrary, would take place with much greater benefit to the main machine were it accelerated.

The device according to my invention does not reduce the speed of the outflow of gases; on the contrary it accelerates said outflow.

According to my invention, a rapid rotary motion is imparted to gases in pipes or nozzles, in order that, under the influence of centrifugal force, the gases may have a tendency to be applied against the walls of said nozzles; at the same time, appropriate apertures are bored into said walls and suitably disposed so that the gases may escape through them, driven by accelerated centrifugal force.

It will readily be seen that, if apertures are sufficiently small and suitably disposed, the gases will be evacuated without shocks or noises. At the same time, no counter pressure will be produced in the gas outlet pipe, since the total surface of the outlet apertures may be sufficient to produce immediate evacuation.

Figs. 3 to 7 are sectional views of various embodiments of the device according to my invention, given by way of example.

Figure 3:
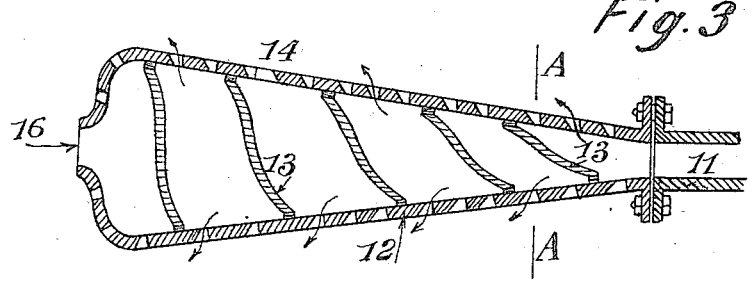
Figs. 3 to 7 are sectional views of various embodiments of my invention as applied to the evacuation of gases issuing from apparatus, engines or devices which let out gases which are still under pressure.

Fig. 3 is a sectional view showing one of the simplest embodiments of said device. The outlet gas pipe is prolonged by a pipe, or muffler, 12, the interior surface of which is provided with ribs, or grooves, 13, similar to propeller paddles, with a constant, or (as in the drawings), a progressive pitch, for instance of the type shown in Fig. 1. Only one groove or rib is shown in the drawings, for the sake of clearness, but it is understood that such grooves, or ribs, might be similar to a screw with several threads, or to the grooves in a fire arm. By reason of the rotary speed imparted to them by said grooves, the gaseous layers on the periphery rotate rapidly and draw the central layers along with them, through the action of viscosity. Apertures 14 are bored in the wall of muffler 12, said apertures being very small but sufficient in number to allow of their total surface being at least equal to the surface of the section of pipe 11. It will be readily understood that the gases, applied by centrifugal force against the walls of the muffler, escape through apertures 14, as they advance along the pipe and are applied against its walls.

Figure 7:
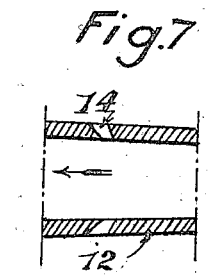

Preferably, the walls of apertures 14 will be disposed as shown in Fig. 7, viz, they will be tapered with respect to the axis of the muffler, said taper decreasing as the extremity of the muffler is reached, so as to be adapted to the direction followed by the gaseous stream. The extremity 16 of the muffler (Fig. 3) may be closed, in which case all the gases will necessarily escape through apertures 14, or, as in the drawings, said extremity may have an opening through which will escape those gases that may not have found an issue through apertures 14.

It is, of course, to be understood that the disposition of the device shown in Fig. 3 is not absolutely necessary. For instance, the height of the grooves, or ribs, may have any value whatever and, if preferred, grooves, or ribs, may be provided only in certain parts of the pipe, or not in the pipe at all if the gases arriving through pipe 11 have already received, from some other device, a rapid rotary motion about the axis of said pipe.

Again, apertures 14 may be bored in a certain part only, for instance along portion A—A of muffler 12, if, before reaching this part, the speed of rotation of the gases is insufficient to impart an appreciable centrifugal force to them.

Figure 4:
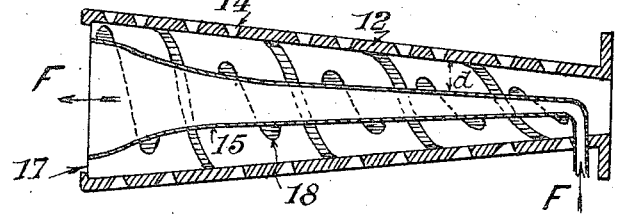

In order to further increase the cooling action and the outflow through apertures 14, a core may be provided inside muffler 12, as shown in Fig. 4.

Said core 15, shown in Fig. 4, may be cooled by a current of air flowing in the direction shown by arrows F. It may be seen that the shape of the core is such that distance $d$, between the outer wall of said core and the inner wall of the muffler, decreases gradually, as the orifice of said muffler is being reached. Core 15 may either obturate completely orifice 17 of the muffler, or, on the contrary, as shown in the drawings, it may leave a small space open for the outflow of such gases as might not have been evacuated through apertures 14. Finally, core 15 may be provided with small helicoidal outer blades 18, which will be parallel to grooves 13 (Fig. 3) of the muffler, in order to further increase the rotary motion of the gases.

Figure 5:
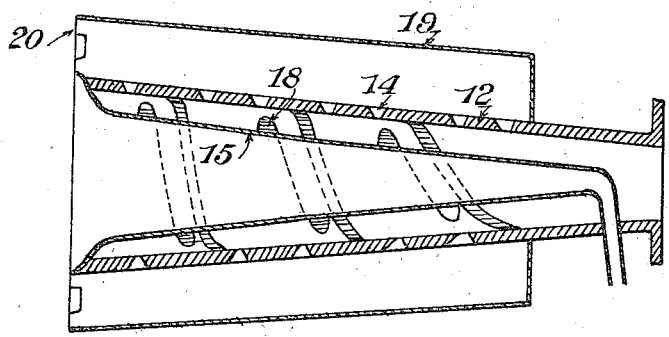

In the preceding embodiments, the gases have escaped directly from the muffler into free air, but it might be desirable, in certain cases, to cause said gases to escape into a closed space. This will be the case whenever it is desired to recuperate said gases, or again, in the case of motor cars for instance, when it is desirable to protect apertures 14 from mud and dust. This embodiment is shown in Fig. 5. In this embodiment of my invention, there still exists, as in Fig. 4, a muffler 12, an inner core 15, small blades 18 for the core, ribs for the muffler and apertures 14, but a supplementary casing 19 is disposed, around the muffler, into which the gases will escape. From said casing 19 the gases will escape into the atmosphere through suitably disposed apertures, as shown at 20, for example.

Naturally, if desired, several perforated casings such as 12 could be provided and, even, small blades such as 18, or ribs such as 13, (Fig. 3), could be disposed between the second casing 12 and the first, in order to also impart a rotary motion to the gases between the successive casings 12. The number of said casings 12 need only be limited by reason of encumbrance or of stoppage of the gases, but, in practice, a single muffler casing 12 will nearly always give satisfactory results.

Figure 6:
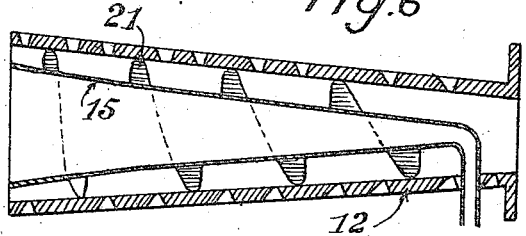

In the embodiment shown in Fig. 6, which may either be applied to the device shown in Fig. 4 or to that shown in Fig. 5, small blades 18 (Fig. 4) and ribs 13 (Fig. 3) may be joined so as to form helicoidal separations 21, connected, on the inner side, to the wall of core 15 and, on the outward side, to the wall of tuyere 12. Naturally, if desired, said separations need not be continuous; they may be provided only along one portion of the device.

Several details of construction may also be modified. For instance, casing 19 (Fig. 5), instead of being tapered, may be a cylindrical pipe of the same interior diameter along the whole of its length.

While I have disclosed what I deem to be preferred embodiments of my invention, I do not wish to be limited thereto, as there might be changes made in the construction, disposition and form of the parts without departing from the principle of my invention as comprehended within the scope of the appended claims.

What I claim is:

1. A pipe for conveying a fluid, which comprises a plurality of helical ribs having substantially in cross section along a plane parallel to the axis of the tube the shape of a cross section of a propeller blade, said ribs extending along a part of the length of the pipe.

2. A pipe for conveying a gaseous stream which comprises a plurality of helical ribs disposed on the inner walls of said pipe having substantially in cross section along a plane parallel to the axis of the tube the shape of a cross section of a propeller blade, said ribs extending longitudinally along a part of the length of the pipe and radially only to a relatively small distance from said walls so as to leave the central portion of said pipe entirely unobstructed, the pitch of said ribs being so chosen as to impart to said gaseous stream a smooth helical movement without eddies about the axis of said pipe.

3. A pipe for conveying a gaseous stream which comprises a plurality of helical ribs disposed on the inner walls of said pipe, the pitch of said ribs being so chosen as to impart to said gaseous stream a smooth helical movement without eddies about the axis of said pipe, said ribs extending inwardly only to a relatively small distance from the walls so as to leave an entirely unobstructed central passage in said tube, said pipe being of gradually increasing cross section in the direction of flow of the gaseous stream so as to cause an expansion of said gaseous stream as it is flowing through said pipe.

NORBERT GALLIOT.